(12) United States Patent
Kalkanoglu et al.

(10) Patent No.: US 8,707,643 B1
(45) Date of Patent: Apr. 29, 2014

(54) ROOFING ELEMENT AND ROOF COVERING COMPRISED THEREOF

(75) Inventors: Husnu M. Kalkanoglu, Swarthmore, PA (US); Gregory F. Jacobs, Oreland, PA (US)

(73) Assignee: CertainTeed Corporation, Valley Forge, PA (US)

( * ) Notice: Subject to any disclaimer, the term of this patent is extended or adjusted under 35 U.S.C. 154(b) by 419 days.

(21) Appl. No.: 12/265,822

(22) Filed: Nov. 6, 2008

Related U.S. Application Data (60) Provisional application No. 60/986,425, filed on Nov. 8, 2007.

(51) Int. Cl.
*E04B 1/70* (2006.01)

(52) U.S. Cl.
USPC ............... 52/302.3; 52/783.18; 52/783.19; 52/173.3

(58) Field of Classification Search
USPC ............ 52/199, 302.3, 518, 783.11, 783.17, 52/783.18, 783.19, 173.3, 95, 302.1
See application file for complete search history.

(56) References Cited

U.S. PATENT DOCUMENTS

| | | | | |
|---|---|---|---|---|
| 2,624,298 A * | 1/1953 | Farren | | 52/533 |
| 3,387,420 A * | 6/1968 | Long | | 52/302.3 |
| 4,023,321 A | 5/1977 | Smith | | |
| 4,977,714 A * | 12/1990 | Gregory, Jr. | | 52/95 |
| 5,009,149 A | 4/1991 | MacLeod et al. | | |
| 5,122,095 A | 6/1992 | Wolfert | | |
| 5,295,339 A | 3/1994 | Manner | | |
| 5,437,735 A * | 8/1995 | Younan et al. | | 136/251 |
| 5,458,538 A | 10/1995 | MacLeod et al. | | |
| 5,772,502 A | 6/1998 | Smith | | |
| 6,061,978 A | 5/2000 | Dinwoodie et al. | | |
| 6,149,517 A | 11/2000 | Hansen | | |
| 6,201,179 B1 * | 3/2001 | Dalacu | | 136/244 |
| 6,299,528 B1 | 10/2001 | Hansen | | |
| 6,780,099 B1 * | 8/2004 | Harper | | 454/186 |
| 6,883,290 B2 | 4/2005 | Dinwoodie | | |
| 6,913,530 B2 * | 7/2005 | Morris et al. | | 454/365 |
| 7,178,295 B2 | 2/2007 | Dinwoodie | | |
| 7,818,922 B2 * | 10/2010 | Ellis | | 52/95 |
| 2002/0011043 A1 | 1/2002 | Freshwater et al. | | |
| 2007/0130850 A1 * | 6/2007 | Miekka | | 52/198 |
| 2008/0083448 A1 | 4/2008 | Borden | | |
| 2008/0302030 A1 | 12/2008 | Stancel et al. | | |

FOREIGN PATENT DOCUMENTS

| | | | | |
|---|---|---|---|---|
| EP | 2075389 A2 * | 7/2009 | | E04D 1/18 |
| WO | 2008124326 A1 | 10/2008 | | |
| WO | 2008/137966 A2 | 11/2008 | | |
| WO | 2008042682 | 11/2008 | | |

(Continued)

*Primary Examiner* — Brian Glessner
*Assistant Examiner* — Adam Barlow
(74) *Attorney, Agent, or Firm* — Paul & Paul (57) ABSTRACT

Roofing elements of the shingle, tile or panel types are applied for mounting onto a roof of a building, as well as a roof covering comprised of such elements. The roofing elements include at least one heat-sensitive weatherproof, protective layer for protecting the building from weather-related intrusions. The roofing elements have one or more continuous venting channels disposed below the heat-sensitive weatherproof, protective layers to form one or more airflow channels beneath the protective layers, with the airflow channels disposed between a lower roof deck of a building and upper heat-sensitive, weatherproof, protective layers of the roofing elements in the installed condition on a roof.

8 Claims, 12 Drawing Sheets

(56) References Cited

FOREIGN PATENT DOCUMENTS

| WO | 2008134677 | A1 | 11/2008 |
| WO | 2008139102 | A2 | 11/2008 |
| WO | WO2008137966 | A2 | 11/2008 |
| WO | WO2008137966 | A3 | 11/2008 |

* cited by examiner

ROOFING ELEMENT AND ROOF COVERING COMPRISED THEREOF

CROSS-REFERENCE TO RELATED APPLICATION

This application is based upon, and claims priority from co-pending provisional application Ser. No. 60/986,425, filed Nov. 8, 2007, entitled Self-Venting Roofing Products, the complete disclosure of which is herein incorporated by reference.

BACKGROUND OF THE INVENTION

It is known to provide roofing shingles, tiles, or panels to a roof, as roofing elements, whereby a plurality of such elements, in the aggregate, when laid up on a roof as a roof covering, can provide a weatherproof, protective layer, for protecting a roofed building from weather-related intrusions.

Some such roofing elements may for example be made in accordance with U.S. Pat. No. 7,118,794, having asphalt components; other such roofing elements may, for example, be comprised of synthetic roofing shingle or tile material, such as those described in U.S. Pat. No. 6,808,785; others of such roofing elements may be comprised of metal components; still others of such roofing elements may be comprised of photovoltaic elements, such as are described in U.S. patent publication U.S. 2007/0251571, the complete disclosures of all of which are herein incorporated by reference.

Other roofing elements for providing a roof covering over a roof deck may be made in accordance with U.S. Pat. Nos. 6,195,951; U.S. Pat. No. 6,355,132 and/or U.S. Pat. No. 6,092,345, the complete disclosures of which are also herein incorporated by reference. It is also known to provide ventilation in the form of a roof ridge ventilator, in accordance with disclosures such as that of U.S. Pat. No. 6,149,517 and U.S. Pat. No. 6,299,528, the complete disclosures of which are also herein incorporated by reference.

In some such instances heat-sensitive layers of roofing elements, such as layers having asphaltic components, layers having metallic components, and/or layers having photovoltaic components, when such elements are raised to undesirable temperatures by heat buildup, there can be experienced some deterioration of the roofing elements and therefore the roof covering formed therefrom, which can conceivably affect the integrity of the roof covering and/or, the life of the roof covering.

In the case of roofing elements that are comprised substantially, or at least partly, of asphaltic material, as well as in the case where shingle elements are comprised of metallic materials, or where photovoltaic materials comprise components of roofing elements, it has been found desirable to protect heat-sensitive components of roofing elements, particularly in geographic areas where roofs of buildings tend to rise to elevated temperatures, such as in southern portions of the United States, particularly during summer conditions. One such approach to protecting heat-sensitive components of roofing elements, is to apply granules to weather-exposed surfaces, to reflect away heat from sunlight and/or to provide lighter colors on top of the weather-exposed surfaces of the shingles, tiles, panels, or other roofing elements, which tend to absorb less heat from the sun and or ultraviolet rays from the sun.

SUMMARY OF THE INVENTION

The present invention is directed toward providing a roofing element of the shingle, tile or panel types, for mounting onto a roof of a building, as well as a roof covering comprised of such elements, wherein the roofing elements include at least one heat-sensitive weatherproof, protective layer for protecting the building from weather-related intrusions, wherein the roofing elements comprise at least one, and preferably several or more, continuous venting channels disposed below the heat-sensitive, weatherproof, protective layer to form an airflow channel beneath the heat-sensitive weatherproof, protective layer of the roofing element, and which is adapted to being disposed between the roof deck of a building and the heat-sensitive, weatherproof, protective layers of the roofing elements, when installed on a roof.

Accordingly, it is an object of this invention to accomplish the invention set forth above, by providing roofing elements that prevent raising the temperature of the elements to an undesirable level.

It is another object of this invention to accomplish the above object, wherein the heat-sensitive, weatherproof, protective layer includes a layer having an asphalt component, a layer having a metal component, and/or a layer having a photovoltaic component.

It is a further object of this invention to accomplish the above objects, wherein the elements are provided with a plurality of continuous venting channels, such that, when a plurality of roofing elements are laid up in courses on a roof, with multiple elements in a single course, and with each course successively, partially overlapping elements in next-underlying courses, the venting channels in successive courses can communicate with each other.

It is a further object to accomplish the above objects, wherein the channels have lateral openings, for air-venting of the elements laterally, as well as upwardly, along the slope of a roof.

It is yet another object of this invention to provide a sloped roof covering, comprising a plurality of elements according to the objects above, that, when laid up on the roof allow for continuous venting via channels upwardly, from element-to-element along the slope of a roof, and optionally, laterally from element-to-element laterally of the slope of a roof.

Other objects and advantages of the present invention will be readily apparent upon a reading of the following brief descriptions of the drawing figures, the detailed descriptions of the preferred embodiments and the appended claims.

DETAILED DESCRIPTIONS OF THE PREFERRED EMBODIMENTS

Figure 1:
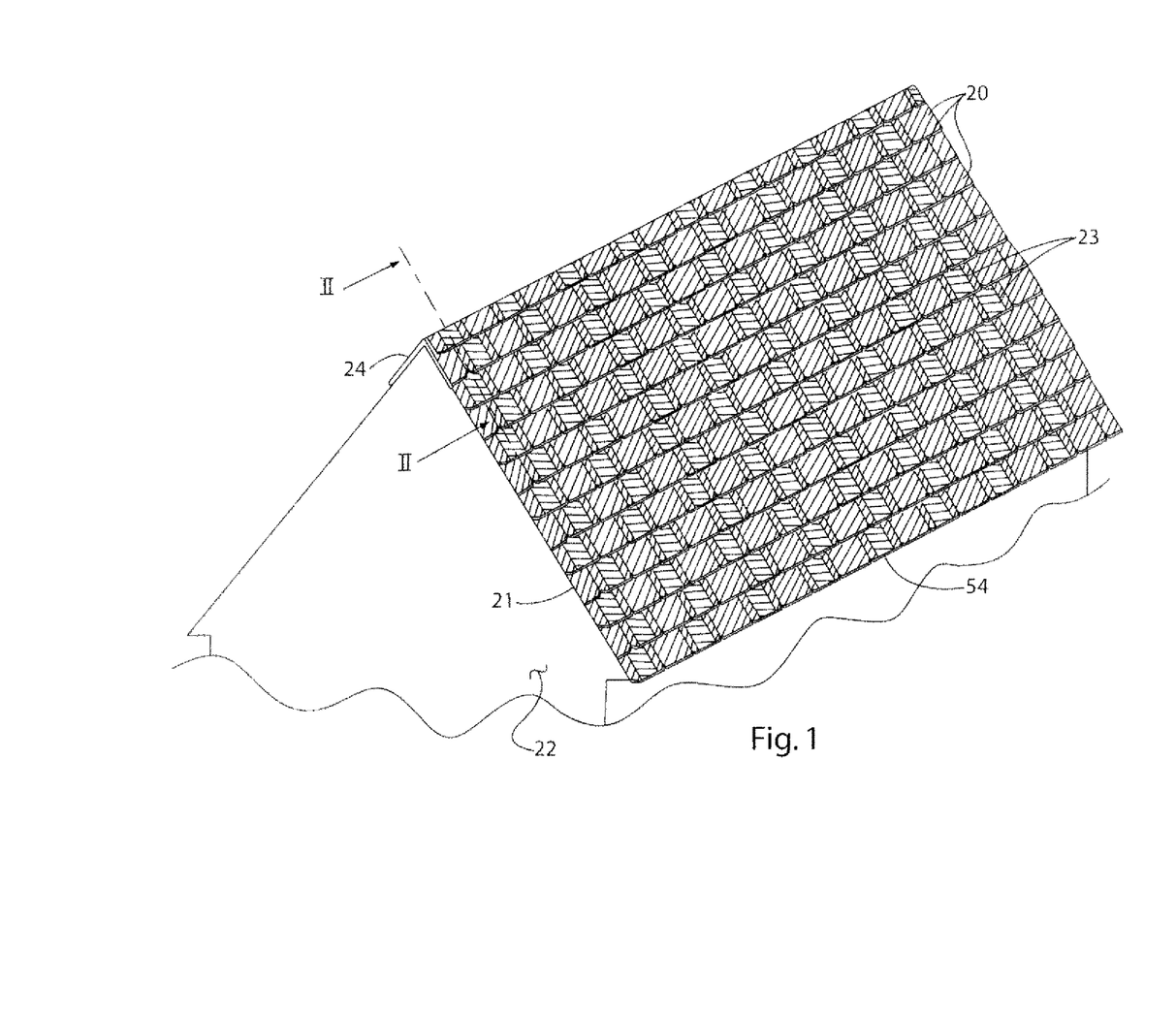
FIG. 1 is a top perspective view of a fragmentary portion of a building, having a plurality of shingles in accordance with this invention that have active photovoltaic elements disposed on portions of the tab portions of the shingles, which photovoltaic elements are adapted to be exposed to sunlight when laid up on a roof.
Figure 4:
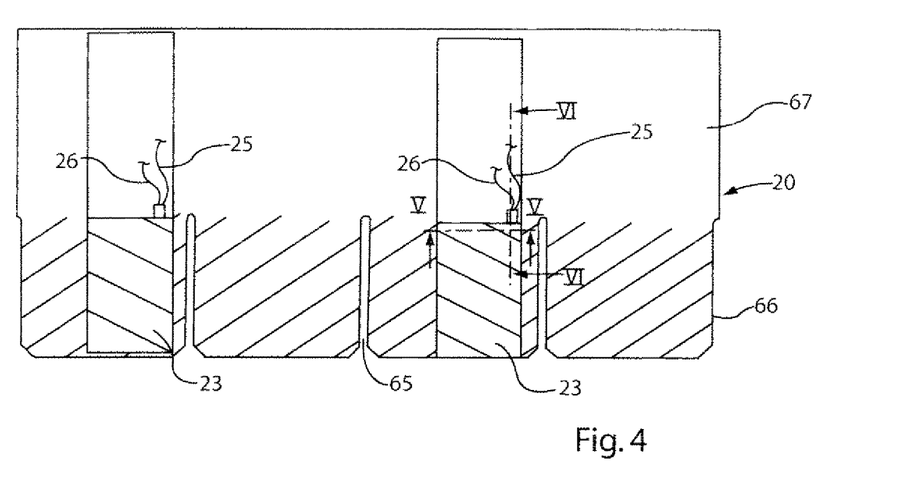
FIG. 4 is a plan view of a multi-layer, multiple tab shingle of the type having asphaltic components, and having photovoltaic components included therewith.

Referring now to the drawings in detail, reference is first made to FIG. 1. It will be seen that multi-tab shingles 20 of the type illustrated in FIG. 4 are shown laid up in courses on a sloped roof deck 21 of a building 22, in lapped relation, with successive courses of shingles of an overlying course having their tab portions overlying butt portions of shingles of a next-underlying course, and with active photovoltaic elements 23 for the shingles being distributed substantially uniformly over at least a major portion of the roof deck 21 to which they are applied, and preferably over substantially the entire roof to which they are applied. At the upper end of the roof deck 21 of FIG. 1 there is provided a roof ventilator 24, also having shingles applied thereover, as shown.

In the array of shingles illustrated in FIG. 1, it will be seen that the photovoltaic elements 23 applied to the shingles 20 are selected to be complemental to the rest of the visible surfaces of the shingles, rather than uniform therewith, although a visually uniform arrangement may optionally, alternatively be provided, if desired.

Figure 1A:
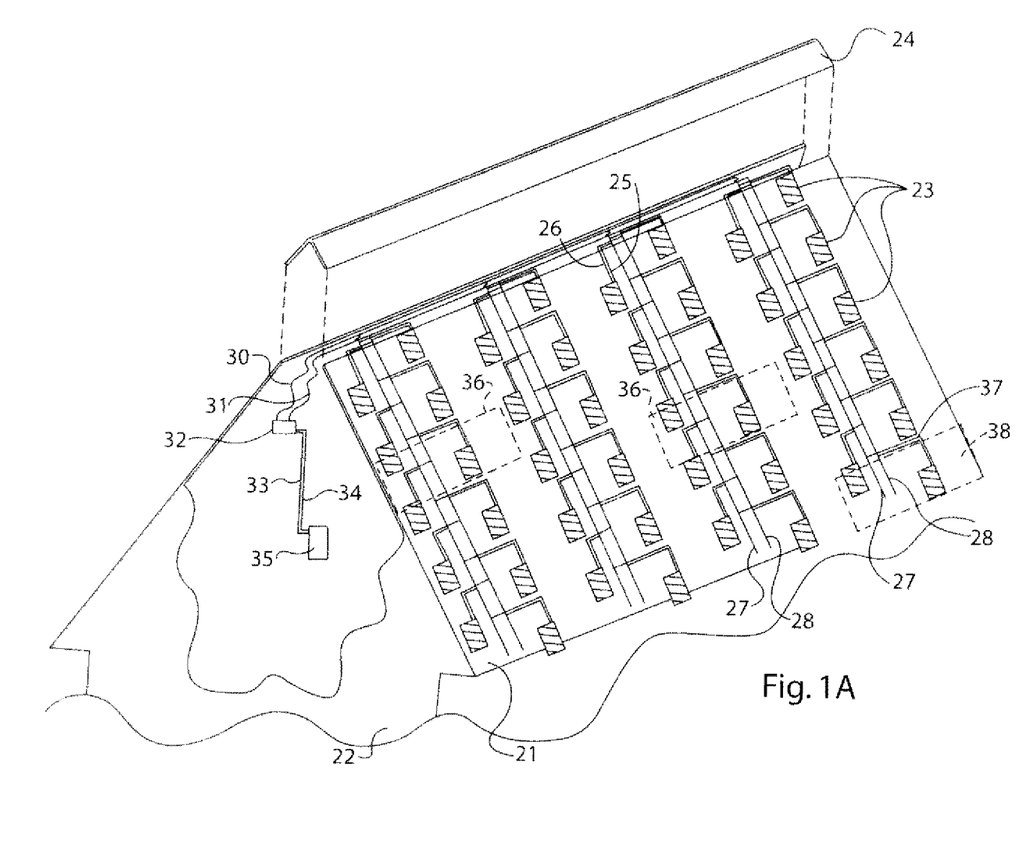
FIG. 1A is a schematic illustration of the electrical connections of active photovoltaic elements of roofing shingles, to electric bus lines that are laid up on a roof prior to application of the shingles, wherein wires from the photovoltaic elements extend up from the tab portions of shingles to which they are applied, across the headlap portions of those shingles, and along the roof to the generally vertically disposed bus lines, prior to application of next-overlying shingles, to openings in the ridge of the roof, and electrically connected to an inverter and electrical panel within the building, and with shingles being illustrated in phantom on the roof, to more clearly illustrate the electrical connections of the photovoltaic elements.

With reference now to FIG. 1A, it will be seen that the photovoltaic elements 23, each with their electric connection wires 25, 26 connected to electric lines 27, 28, run in a series of generally vertical grids, up along the sloped surface of the roof deck 21, as shown, with the grid wires 27, 28 in turn being connected through a ridge opening to electric connection wires 30, 31, that, in turn, may be connected to an inverter 32 that, in turn, is connected via wiring 33, 34 to control box 35 in the building. The building may be a house, warehouse, office building or other structure.

In the illustration of FIG. 1A, while the photovoltaic elements 23 for the shingles 20 are shown, the shingles 20 are not illustrated, for the sake of clarity, except to the extent that they are illustrated in phantom at a few locations 36 in FIG. 1A. This is because, in the representative embodiment of FIG. 1A for electrically connecting the photovoltaic elements 23, it will be seen that the wires 25, 26 travel up into the headlap portions of the shingles on which they are mounted, to transcend above the upper edges of the headlap portions of those shingles, as shown, for example, at 37 in the lower right corner of FIG. 1A, to then pass laterally for electrical connection to the wires 27, 28, so that, preferably, no wiring will have to pass through a shingle, per se, in that a next-overlying shingle such as that illustrated in phantom 38 will then cover the wiring of the underlying shingle, and that therefor, as successive courses of shingles are applied to a roof, the wiring associated with the photovoltaic elements 23 of a previously applied course of shingles will be covered by the next-overlying course of shingles and that all of the photovoltaic elements 23 will be connected together in the grid shown in FIG. 1A, for example.

It should be understood that variations of the electrical connections could be made, within the scope of this invention. For example, while FIG. 1A illustrates an array having a series of generally vertical grids for the electrical connections with system connections by way of a ridge opening, alternative embodiments could have other orientation, such as, for example, generally horizontal grids with system connections at an edge of a roof or a roof portion. For example, the electrical connections could proceed to a rake or valley in the roof structure, or to other locations in a complex roof, while preferably avoiding the necessity of making a number of additional openings or holes through the roof deck and/or its shingles.

Figure 2:
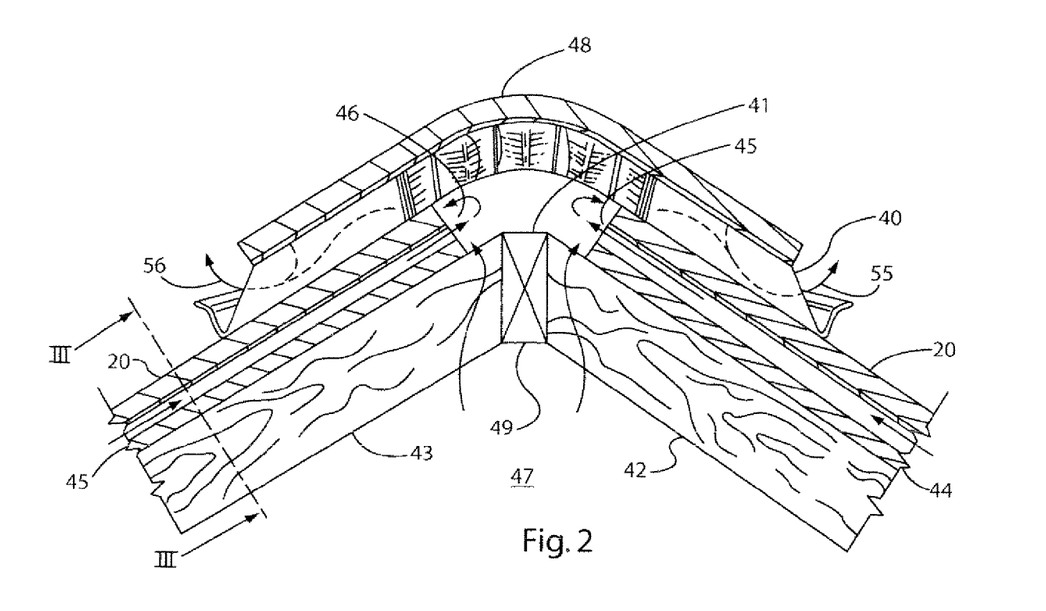
FIG. 2 is a fragmentary vertical sectional view take through an end-ventilating ridge roof ventilator, transversely thereof, and taken through a fragmental portion of a shingled roof to which the ventilator is applied.
Figure 3:
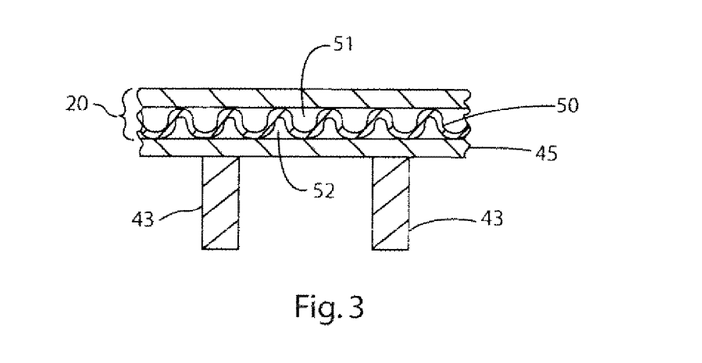
FIG. 3 is an enlarged sectional view, taken through a portion of the illustration of FIG. 2, generally along the line thereof, and wherein a plurality of channels are illustrated, in the form of a corrugated sheet, with corrugations running up the roofing element, parallel to the slope of the roof, providing venting channels beneath the heat-sensitive, weatherproof, protective layer of the roofing element disposed thereabove, and between that protective layer and the roof deck, itself.

Reference will now be made to FIGS. 2 and 3. In FIG. 2, a molded, somewhat flexible ventilator 40, is shown, applied to the ridge of the roof, generally designated at 41. The roof is comprised of a number of transverse rafters 42, 43, of a given pitch, as shown, secured to a longitudinal ridge beam 49, extending longitudinally along the apex of the roof. Plywood or other roof boards 44, 45 are shown, nailed or otherwise secured by means (not shown) to the rafters 42, 43, in a conventional manner, leaving vent openings 45', 46' between the upper ends of the roof boards 44, 45, in a conventional manner, for air from an attic 47 to pass through vent openings 45', 46' to the outside ambient, as will be described hereinafter.

The ventilator 40 has a ridge shingle 48 applied thereover, for weather protection, in a conventional manner.

With particular reference to FIG. 3, it will be seen that a shingle 20, which includes at least one heat-sensitive weatherproof, protective layer (unnumbered), such as an asphalt component for protecting the building from weather-related intrusions is provided. Beneath the shingle 20, there is disposed a corrugated layer 50 connected thereto, having upwardly facing channels 51, and downwardly facing channels 52, which channels run from a lower edge (unnumbered) of the shingle up along the slope of the roof, along the underside of the shingle 20.

As will be described hereinafter, the shingles in the array of shingles 20 illustrated in FIG. 1 may have their channels 51, 52, connected to each other, so that venting airflow through channels 51, 52, of shingles at a lower portion of the roof of FIG. 1 will communicate through corresponding channels 51, 52 of other roofing elements, on the undersides of the shingles 20 of the roofing elements, for venting air flow from a lower edge 54 of the roof, to an upper edge of the roof covering, in zones 45, 46, and out through the ventilator 40 in the manner shown by the airflow arrows 55, 56 of FIG. 2.

While the material of construction of the shingles 20 has been described, as being shingles having an asphalt component that is heat-sensitive under certain temperature conditions, it will be understood that the heat-sensitive portions of shingles 20 could alternatively be comprised of heat-sensitive metal components, and in the embodiments shown in FIG. 1, are comprised of photovoltaic components, likewise heat-sensitive.

Figure 5:
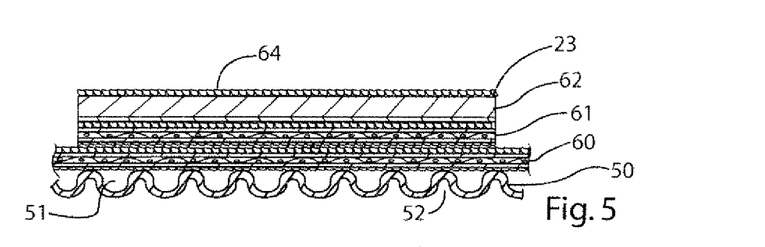
FIG. 5 is an enlarged transverse sectional view, taken through the shingle element of FIG. 4, generally along the line V-V thereof.
Figure 6:
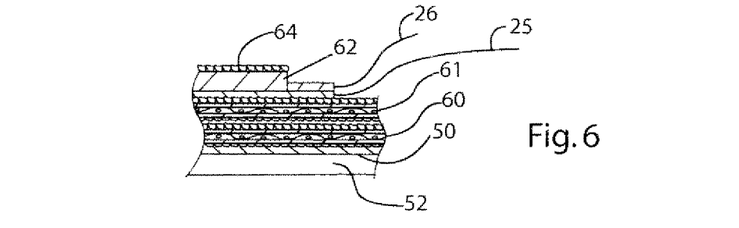
FIG. 6 is a vertical sectional view, taken through the shingle element of FIG. 4, generally along the line VI-VI thereof.

Referring now to the illustration of FIGS. 4-6, it will be seen that the shingle 20 is a three-layer shingle, comprised of a posterior layer 60, an anterior layer 61, and a plurality of overlying shingle layers 62 on the upper surface of the anterior layer 61, preferably spaced apart as shown. It will be understood that the layers 62 can be placed overlying other portions of the anterior shingle layer 61, as may be desired for different aesthetic effects. On or in the shingle layers 62 are the photovoltaic components 23, which preferably also have granules 64 thereover. The anterior shingle layers 61 may have a plurality of slots 65 therein, that may be aesthetically enhanced by cut-out notches, as shown. The general construction of the shingle 20 may be as set forth, for example, in U.S. Pat. Nos. 5,181,361 and/or 5,209,802. The shingle layers 60, 61, 62 may be comprised of a layer of fiberglass or other mat impregnated with bitumen on upper and lower surfaces, with granules applied to upper surfaces, and with a layer of smaller granular particles, such as sand, mica, etc. on lower surfaces. The various layers of the shingles 20 may be connected by adhesive, which may or may not be a bituminous material, for connecting the layers together. The photovoltaic components 23 are adapted to receive solar energy and to generate electricity therein for delivery to an electricity grid within the house or other building.

The various cross-hatchings shown on the surface of the shingle 20 in FIG. 4 are to demonstrate different aesthetic appearances for the tab portions, or the lower portion 66 of the shingle 20, with the upper portions 67 of the shingle 20 comprising butt portions.

With respect to FIGS. 5 and 6, in particular, it will be seen that the corrugated layer 50 provides upper and lower venting channels 51, 52, as described above.

The material of construction of the corrugated layer 50 may be of any of various materials, but preferably will be of a non-metallic material, such as a molded fiberboard, or molded plastic sheet, of the thermoplastic or thermosetting types, as may be desired, or of any other materials that lend themselves to ready construction of a corrugated sheet.

Figures 7, 8:
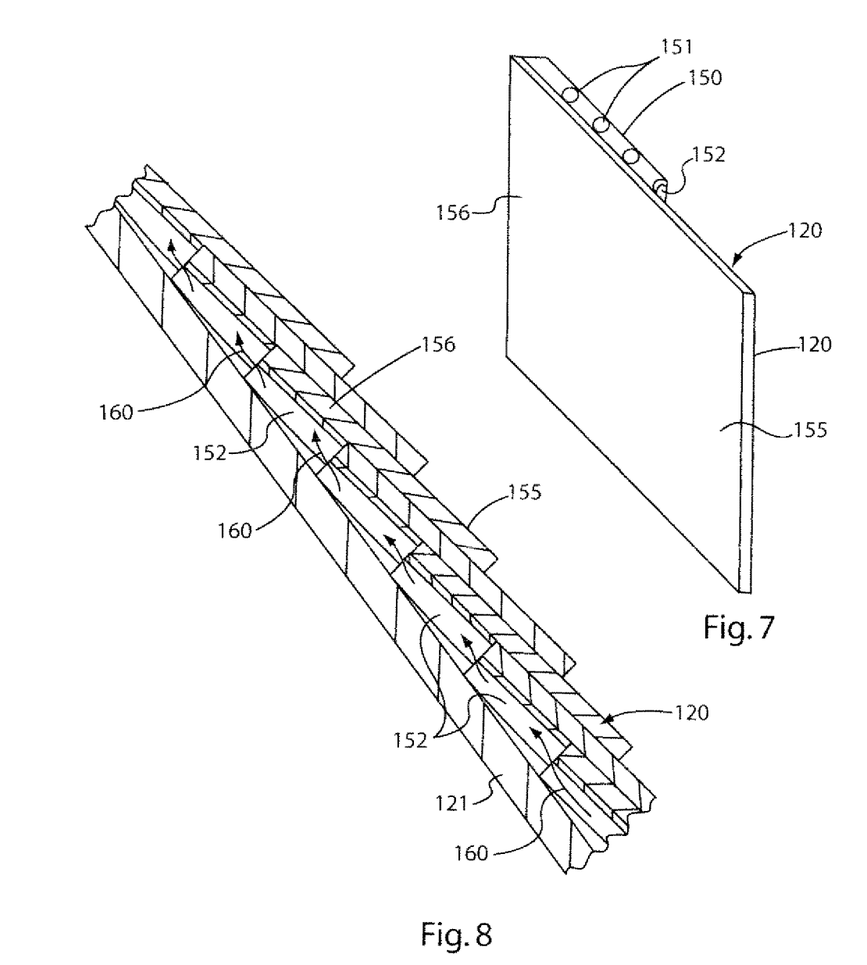
FIG. 7 is a top perspective view of a roofing element in accordance with this invention, that may be constructed to have any of an asphaltic component, a metal component and/or a photovoltaic component, and which has venting channels running from about the mid point of the shingle element, to an upper edge thereof, with the venting channels being comprised of a corrugated layer, and having lateral openings therein.
FIG. 8 is an enlarged, fragmentary, vertical sectional view, taken through a roof deck and a plurality of courses of roofing elements laid thereon, with venting passages running from element-to-element, in communication with each other, from course to course, up along the slope of a roof.

With reference now to FIG. 7, an alternative roofing element 120 is shown, having a plurality of venting channels 152 beneath the protective layer 120', similar to those channels 52 of the corrugated sheet 50 of FIG. 5, but wherein the corrugated sheet 150 is provided with a plurality of lateral openings 151 therein, such that, when a plurality of roofing elements 120 are laid up on a roof deck, as shown in FIG. 8, with their lower, or tab portions 155 overlying upper or butt portions 156 of the elements 120, with adjacent elements 120 being arranged side-by-side, in courses from a lower end of the roof deck 121 to an upper end thereof, their channels 152 can communicate with each other as shown by the venting airflow arrows 160 in FIG. 8, for providing airflow through successive courses of roofing elements 120, from a lower end 54 of a roof deck, up to a ridge ventilator, as shown in FIG. 1. Also, with respect to the roofing elements 120 illustrated in FIGS. 7 and 8, it will be seen that the lateral vents 151 allow for lateral airflow between adjacent roofing elements 120 in the same course.

The roofing elements 120 may be comprised of any of various materials, including but not limited to the materials described in U.S. Pat. No. 6,808,785, as being synthetic roofing shingles or tiles, or could be comprised of conventional asphalt materials, materials having metallic components, photovoltaic components, or the like.

In the embodiment of FIGS. 7 and 8, it will be seen that the channels 152 that are provided by the corrugated layer 150 exist only behind the butt portions 156 of the roofing elements 120.

Figures 9, 10:
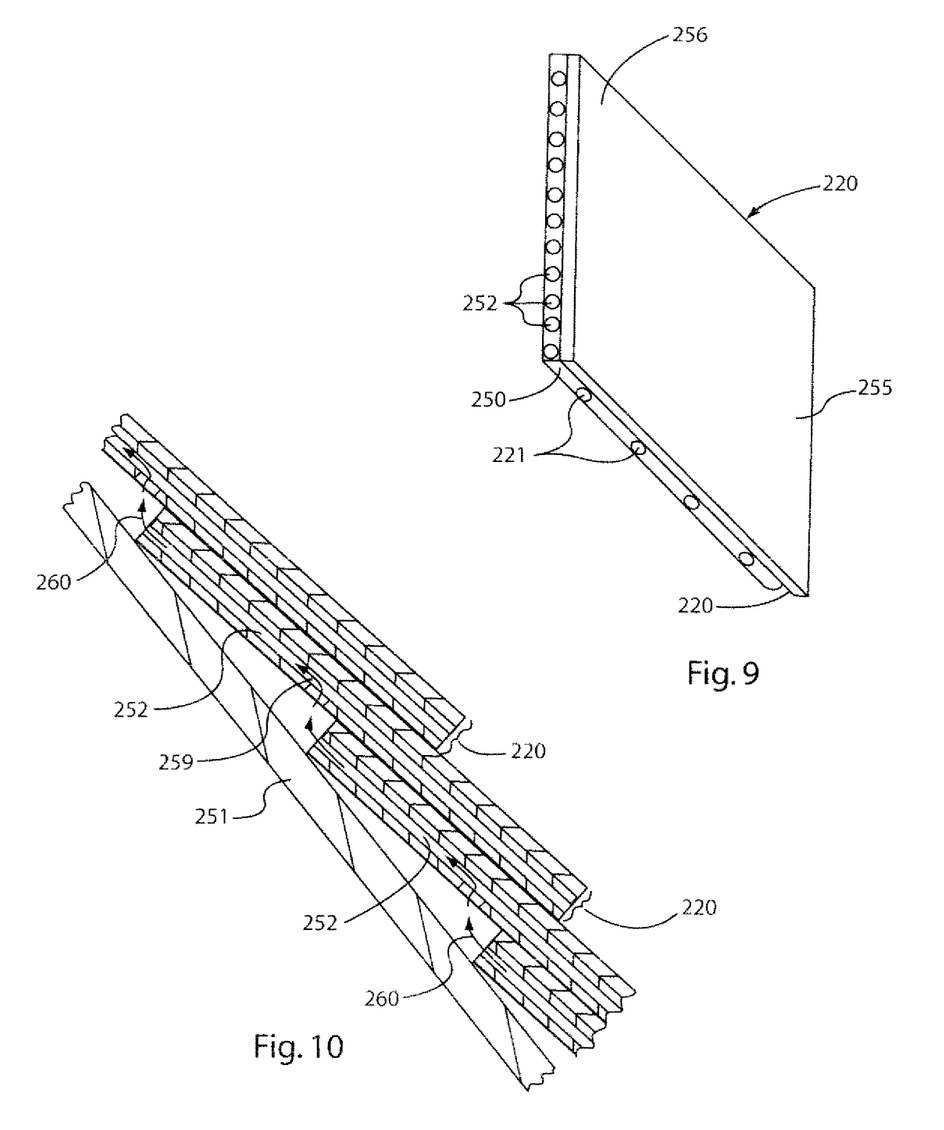
FIG. 9 is a view similar to that of FIG. 7, but wherein the venting channels beneath the heat-sensitive, weatherproof, protective layer of the shingle elements extend from a lower edge to an upper edge of the roofing element, in channels, with lateral openings in the venting channels, for venting of the roofing elements laterally, in the same course of elements, from element-to-element in each course, when the elements are laid up on a roof deck, in courses.
FIG. 10 is an illustration similar to that of FIG. 8, but wherein the venting channels extend from a lower edge of the element, to an upper edge of the element, in each case.

With reference now to FIGS. 9 and 10, it will be seen that roofing elements 220, that may be comprised of materials similar to those set forth above for the elements 120 of FIGS. 7 and 8, are provided with alternative channels 252 beneath the protective layer 220', formed in a channel-providing layer 250, with the layer 250 also having lateral openings 221, functioning in a manner similar to the openings 151 in the embodiment of FIG. 7. The channels 252 in the embodiment of FIG. 9 extend behind both tab portions 255 and butt portions 256 of the roof elements 220. Venting airflow in the embodiment of FIGS. 9 and 10 thus proceeds beneath the entire area of the heat-sensitive portions of the roofing elements 220, up along the slope of a roof in the direction indicated by the arrows 260 of FIG. 10, via openings 259, as well as being able to proceed laterally via openings 221 throughout the entire height of the roofing elements 200, between and through adjacent roofing elements 220 in the same course of roofing elements applied to a roof deck 251.

Figure 11:
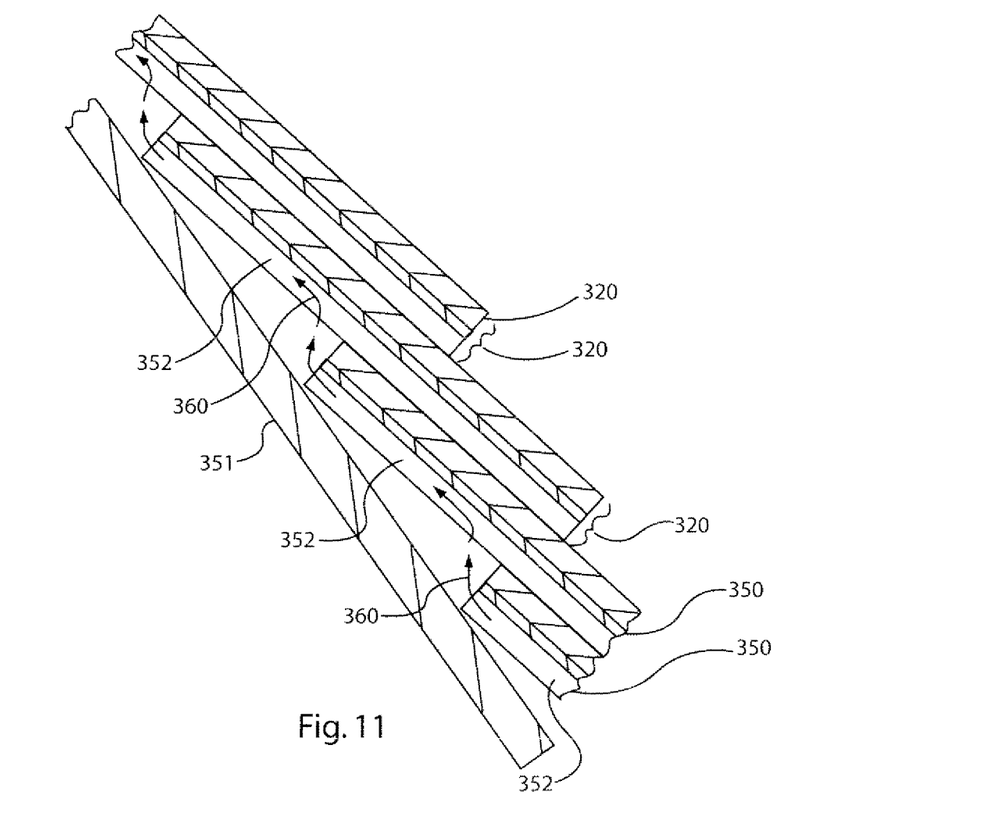
FIG. 11 is an illustration similar to that of FIG. 10, but wherein the venting channels are of the corrugated sheet type.

With reference now to the embodiment of FIG. 11, it will be seen that the roof deck 351 is provided with roofing elements 320, arranged in overlapping relation, as are the roofing elements 220 of FIG. 10, but wherein the channels 352, of the corrugated sheet 350, beneath the protective layer 320' are present in downwardly and upwardly facing openings of the corrugated sheet 350, in that the corrugated sheet 350 is constructed in a manner similar to that 50 of FIG. 5. Otherwise, the airflow as shown via arrows 360 is much the same as that for the arrows 260 of FIG. 10.

Figure 12:
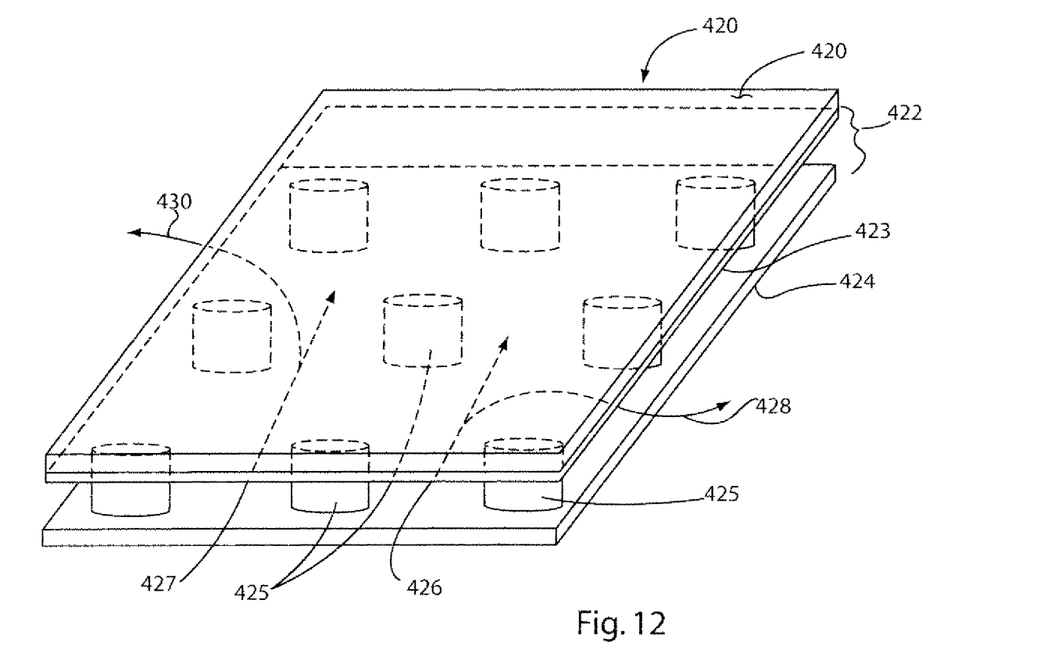
FIG. 12 is a top perspective view of a roofing element of the shingle, tile or panel types, wherein a pair of sandwiching layers are spaced-apart by spacers sandwiched therebetween, which spacers are generally shown in dashed lines, and wherein the element of FIG. 12 has disposed thereover a heat-sensitive, weatherproof, protective layer, for venting of that heat-sensitive, weatherproof, protective layer, via the various channels that exist between the underlying spaced-apart sandwiching layers.

With reference now to FIG. 12, it will be seen that roofing elements 420 can be provided, in the form of panels that are comprised of a heat-sensitive uppermost layer 420', that can have any of an asphalt component, a metal component, a photovoltaic component, for which venting coolant air is desired, with the venting being accomplished beneath the heat-sensitive protective layer 420', with a venting type sandwiching unit 422 being comprised of upper and lower sandwiching layers 423 and 424, with a plurality of spacers 425, extending therebetween and connecting the sandwiching layers 423, 424, in sandwiched relation, allowing for airflow in many directions therethrough, such as shown by the arrows 426, 427, 428 and 430. A plurality of panels 420 of the type illustrated in FIG. 12 can be placed on the deck of a roof, with each one being constructed with the sandwiching layer 422 separate from the heat-sensitive layer 420', or in the alternative, the panels 420 can be applied to a roof deck with the sandwiching unit 422 and the heat-sensitive layer 420' connected together, as a unit, and with various such units covering the entire roof deck. For assemblies of multiple roofing elements 420 of FIG. 12, when applied to a roof deck, especially when the sandwiching unit 422 is applied separately from the heat-sensitive layer 420', the sandwiching unit 422 can serve as an alignment indicator for placement of overlying courses of heat-sensitive layers 420', be they any of the shingle, tile, or panel types.

Figures 13, 14:
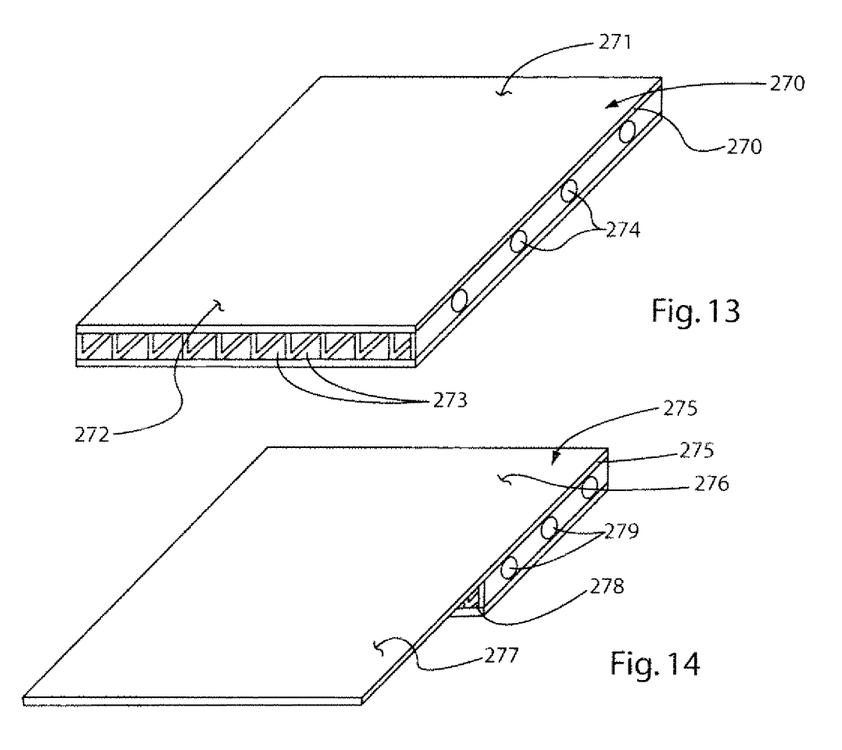
FIG. 13 is a top perspective view of a roofing element in accordance with this invention, somewhat similar to that of FIG. 9, but wherein the venting channels beneath the heat-sensitive, weatherproof, protective layer of the shingle elements are of a different configuration, being a saw-tooth configuration, and with optional lateral openings in the venting channels, for venting of roofing elements laterally, in the same course of elements, from element-to-element in each course, when the elements are laid up on a roof deck, in courses, and wherein the venting channels extend beneath both tab and butt portions of the roofing elements.
FIG. 14 is an illustration similar to that of FIG. 13, but wherein the venting channels extend substantially only beneath the tab portions of the protective layer, and with the venting channels likewise being of saw-tooth configuration.

With reference now to FIG. 13, it will be seen that a roofing element 270 is provided, having tab and butt portions 271 and 272, respectively, and beneath the heat-sensitive protective layer 270', there are disposed elongated channels 273 of sawtooth configuration, as shown, with each channel being comprised of a leg that is essentially perpendicular to the protective layer 270', and a leg that is at an angle thereto, such as, perhaps 40°, for example, with the channels 273 extending longitudinally of the element 270. Optionally, lateral vent openings 274 are provided, for functioning similar to the lateral openings 221 as addressed above for FIG. 9.

FIG. 14 is an illustration similar to that of FIG. 13, but wherein the channels 278, while being constructed of sawtooth configuration like the channels 273 of FIG. 13, extend substantially only beneath the butt portion 276 of the element 275, beneath the protective layer 275', and do not extend beneath the butt portion 277 of the protective layer 275', to any substantial extent. Optionally, lateral vent openings 279 are provided, similar to the openings 274 of FIG. 13.

Figure 15:
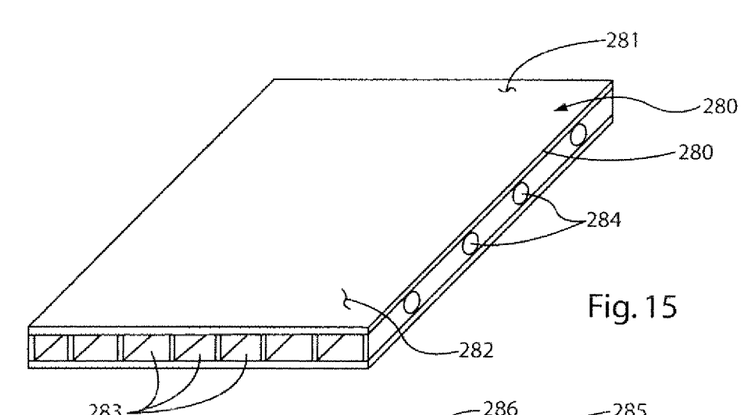
FIG. 15 is an illustration similar to that of FIG. 13, but wherein the venting channels are constructed as longitudinal rectangular channels, rather than the saw-tooth configuration of FIG. 13.
Figure 16:
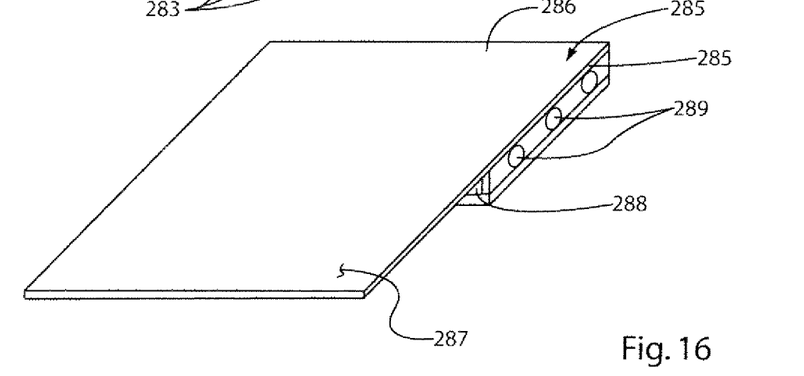
FIG. 16 is an illustration somewhat similar to that of FIG. 14, but wherein the venting channels, while being constructed similar to the venting channels of FIG. 15, extend substantially only beneath the tab portions of the protective layer.

FIGS. 15 and 16 are illustrations of alternative roofing elements to those of FIGS. 13 and 14, addressed above, with the roofing elements 280, 285, having elongate channels 283, 288, respectively extending beneath the protective layers 280', 285', with the channels also optionally having lateral openings 284, 289. In the embodiment of FIG. 15, the channels 283 extend beneath both tab and butt portions 281, 282 of the element 280, whereas in the embodiment of FIG. 16, the channels 288 extend substantially only beneath the butt portion 286 of the element 285, and not substantially beneath the tab portion 287 of the element 285.

Figure 17:
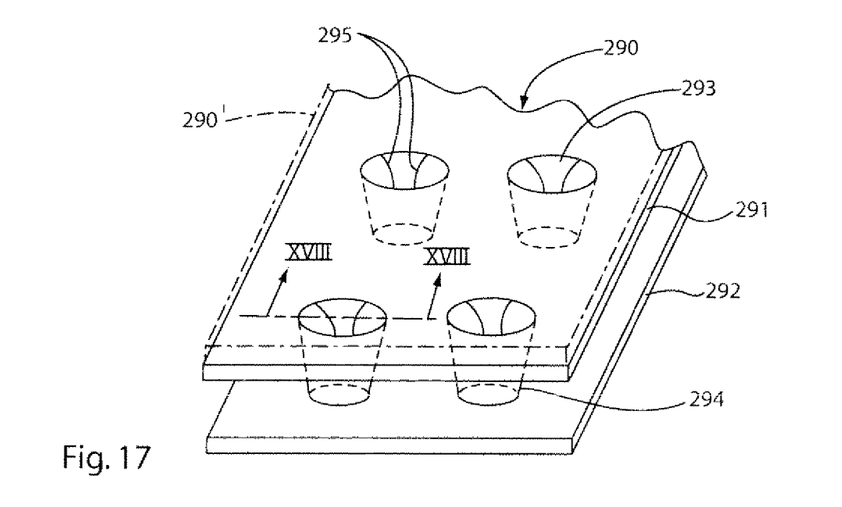
FIG. 17 is a fragmentary, top perspective view of a roofing element of the shingle, tile or panel types, wherein a pair of sandwiching layers are spaced-apart by indented spacers, pressed downwardly from the uppermost sandwiching layer, and are comprised of material of the uppermost sandwiching layer, and wherein for reasons of clarity, the heat-sensitive, weatherproof, protective layer is illustrated in phantom above the sandwiching layers.
Figure 18:
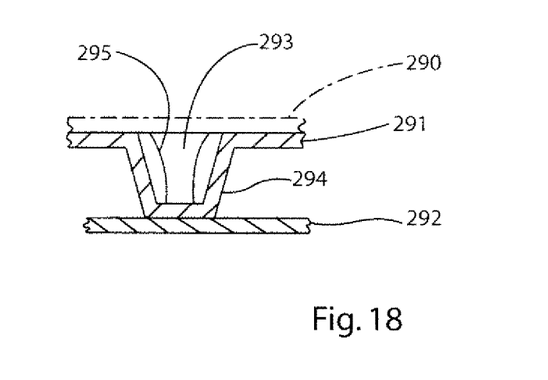
FIG. 18 is a fragmentary, vertical sectional view, taken generally along the line XVIII-XVIII of FIG. 17.

Referring now to FIGS. 17 and 18, an alternative form of roofing element 290 is illustrated, with the heat-sensitive protective layer 290' being shown in phantom, to enable greater clarity for illustrating the details of the remaining portions of the element 290. Beneath the protective layer 290', it will be seen that, for the illustration of FIG. 17, a plurality of cup-like spacers 294 are provided, having their upper ends 293 open beneath the protective layer 290', and providing a spacer between upper and lower sandwiching layers 291, 292. The inside of the cup-like spacers 294 may have fold or wrinkle lines 295, as shown, depending the manner of formation of the cup-like spacers 294, such as from having been pressed downwardly from sandwiching layer 291, to be in engagement with, and preferably attached to layer 292, at the bottom of the cup-like structure 294.

Figure 19:
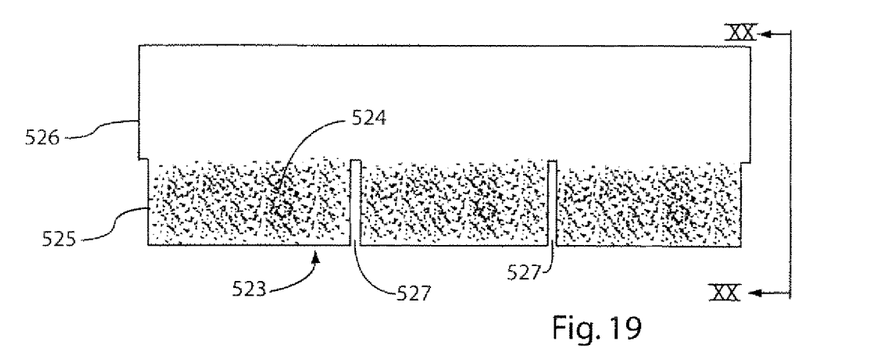
FIG. 19 is a top plan view of a typical multi-tab shingle, in accordance with this invention that is comprised, at least in part of asphaltic material.
Figures 20, 21:
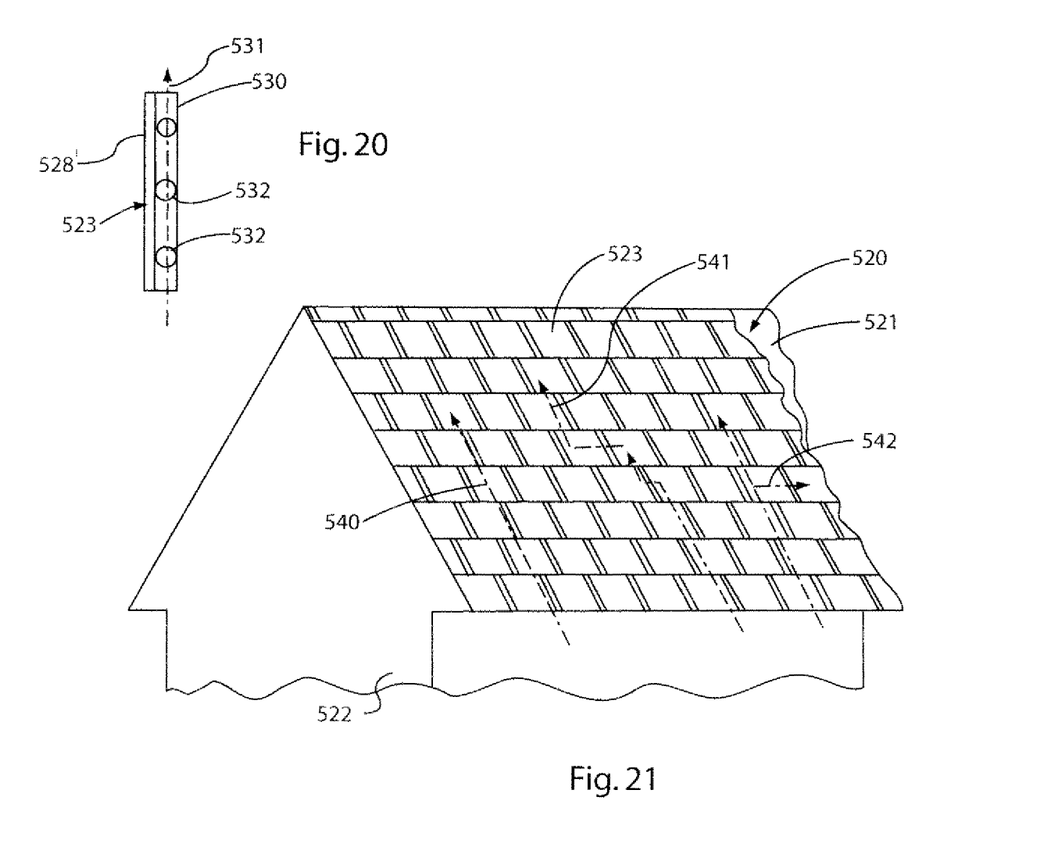
FIG. 20 is a side elevational view of the shingle element of FIG. 19, taken generally along the line XX-XX of FIG. 19, and wherein the lateral openings in the vertical vent channels are clearly illustrated, and wherein the broken-line arrow illustrates the flow of air upwardly, from a lower edge of the shingle of FIG. 19, through the upper edge thereof.
FIG. 21 is a top perspective view of slope of a roof of a building, with shingle elements in accordance with this invention applied thereto, and with various arrows showing the ability to continuously vent via channels in accordance with this invention, both up the slope of a roof and laterally of the slope of the roof, and combinations thereof.

Referring now to FIGS. 19-21, it will be seen that in FIG. 21, an entire sloped roof covering 520 is provided, covering a roof deck 521 of a building 522. The covering 520 is comprised of a plurality of roofing elements 523, which, in the embodiment shown can, in turn, be constructed in the manner of multi-tab shingles 523, of the type shown in FIG. 19, which may be of a conventional asphalt shingle type, comprised of asphalt-impregnated fiberglass mat, with granules 524 applied at least in the lower, or tab portions 525 thereof, although the same or other types of granules could be applied on the upper surface of the butt or headlap portions 526 thereof. In the embodiment shown, the tabs are separated by slots 527, in the conventional manner.

With reference to FIG. 20, it will be seen that the roofing elements in the form of shingles 523 are comprised of a heat-sensitive layer 528', and a venting layer 530. The venting layer 530 has channels running from the lower edge of the tab portions, to the upper edge of the headlap portions, as shown, allowing for airflow beneath the heat-sensitive layer 528' when the shingles are laid up on a sloped roof, with such airflow being in the direction of the arrow 531, but with lateral opening 532 allowing for lateral airflow from the upwardly oriented channels of the venting layer 530, laterally, to exit via the slots 527, thus producing a wide range of airflow patterns, as indicated by the various airflow patterns indicated by the arrows 540, 541, 542, in myriad paths up the slope of the roof and laterally of the slope of the roof, and combinations thereof.

It will be seen that the vent-providing layers of the roofing elements in accordance with this invention, in addition to providing venting, for dissipation of heat, may also lend an insulating effect, both of which effects help reduce heat and transfer it away from the heat-sensitive element.

The various roofing elements in accordance with this invention may be attached to a roof by conventional means, such as nails or staples through the shingles or panels, as is conventional in applying roofing elements to roof decks.

It will also be apparent that the venting that is provided through this invention can also provide a beneficial effect when the roof product has photovoltaic capability, in particular. In such a situation, the venting can assist the performance of the photovoltaic cells as the efficiency of the crystalline silicon photovoltaic modules or other photovoltaic modules in generating electricity tends to be reduced as heat increases.

Another feature of providing venting structures in accordance with this invention, of a corrugated plastic sheet type, or of a sandwiched type as addressed above, is that such venting structures provide substantial crush resistance, thereby allowing foot traffic on the roof. It is also apparent, in the case of corrugations, that the same could run in any direction that would not inhibit airflow as described above, when they are applied to the roof.

It will be apparent from the foregoing that various modifications may be made in the details of construction, as well as in the use and operation of the roofing elements of this invention, and in the construction and use of a roof covering, all within the spirit and scope of the invention as defined in the appended claims.

What is claimed is:

1. A roofing element of the shingle, tile, or panel types, for mounting onto a roof of a building, wherein the roofing element is a unitary structure comprised of a heat-sensitive weatherproof, protective layer and a venting layer connected to the protective layer, wherein the protective layer is adapted for protecting the building from weather-related intrusions, which heat-sensitive protective layer can be raised to an undesirable temperature by a buildup of heat, with the venting layer having a plurality of continuous venting channels disposed below said heat-sensitive weatherproof, protective layer; with the roofing element being adapted to being disposed on a roof of a building; wherein the at least one heat-sensitive weatherproof, protective layer includes any of:
    (a) a layer having an asphalt component;
    (b) a layer having a metal component; and
    (c) a layer having a photovoltaic component;
wherein the roofing element has an upper edge and a lower edge and side edges defining therebetween an upper headlap portion normally covered in the installed condition on a roof and a lower tab portion normally uncovered in the installed condition on a roof;
wherein the roofing element is adapted to being disposed in overlying and underlying courses on a sloped roof of a building with its upper edge higher on the slope of the roof of the building than the lower edge of the roofing element with tab portions of the roofing elements in next-overlying courses covering headlap portions of roofing element in next-underlying courses; wherein the continuous venting channels are each comprised of channel passageways and channel wall portions, with the channel wall portions extending away from the protective layer, with the channel wall portions and the channel passageway portions extending from the lower edge of the roofing element to the upper edge of the roofing element through the entirety of the tab portion and headlap portion of the roofing element and; wherein when roofing elements are disposed on a sloped roof of a building, in courses, air flow can be vented beneath the protective layer of roofing elements beneath from course to course, wherein the continuous venting channels are provided with lateral openings through said side edges for continuous lateral venting of air therethrough from laterally adjacent element to laterally adjacent element when roofing elements are installed on a sloped roof.

2. The roofing element of claim 1 wherein at least some of the continuous venting channels are corrugations of corrugated sheet.

3. A sloped roof covering of a building comprising a plurality of roofing elements according to claim 1 with said roofing elements being laid up on the roof in courses; with a plurality of roofing elements being in the same course; and with roofing elements in successive next-overlying courses partially overlying roofing elements in next-underlying courses; and with continuous venting channels of roofing elements in underlying courses communicating with channels of roofing elements of next-overlying courses for passage of venting airflow up the slope of the roof.

4. The sloped roof covering of claim 3, wherein the venting channels comprise a corrugated sheet.

5. The sloped roof covering of claim 3; with said continuous venting channels and said lateral openings comprising means whereby ventilation can occur beneath the heat-sensitive weatherproof, protective layers of the roofing elements in myriad paths, up the slope of the roof and laterally of the slope of the roof, and combinations thereof.

6. The roofing element of claim 1, wherein at least some of the channel wall portions are in a generally perpendicular direction relative to the protective layer.

7. The roofing element of claim 1, wherein at least some of the channel passageways have bottom portions that are closed between channel wall portions.

8. The roofing element of claim 1, wherein at least some of the channel passageways are free of bottom portions between channel wall portions.

\* \* \* \* \*